Patented Dec. 7, 1926.

1,609,308

UNITED STATES PATENT OFFICE.

WILLIAM BEACH PRATT, OF WELLESLEY, MASSACHUSETTS, ASSIGNOR TO RESEARCH INCORPORATED, OF BOSTON, MASSACHUSETTS, A CORPORATION OF MASSACHUSETTS.

PROCESS OF DISPERSING BODIES IN WATER.

No Drawing.  Application filed November 13, 1924. Serial No. 749,803.

This invention has relation to the dispersion in water of gums, waxes, bitumens, pyrobitumens, oils, terpenes, certain fatty bodies and the like which are immiscible with water, and has for its object to provide a process by which these substances may be dispersed in particles of such fineness or infinitesimal size as to be of the character of colloids.

According to my process, I employ a dispersing or stabilizing agent which itself is colloidal, and which may be of animal, vegetable, or mineral origin, since the practice of the process does not depend upon the selection of any particular dispersing agent, unless the resultant product is to possess certain predetermined characteristics.

I have discovered that if the body to be dispersed, unless already in a tacky more or less plastic condition, is brought to this condition by a heating or chilling medium, all at a temperature above the freezing point and not above the boiling point of water, it may be caused to absorb a certain amount of water. The amount of water so absorbed varies with the absorption capacity of the particular material to be dispersed, but ordinarily the amount up to the saturation point of the body ranges from 10% to 15% of the weight of the material. After the water is thus absorbed by and dispersed throughout the mass of the material, I now mix therewith a colloidal dispersing agent, and also water in graduated amounts until a change in phase occurs and the material disperses in a continuous aqueous medium.

After considering the phenomena occurring or resulting from the various steps of the process, I have formed a theory, which if correct, explains the dispersion of the materials in particles of an order so minute as to be colloidal in size. By conditioning the material to be dispersed (e. g. asphalt), so that at a temperature not above the boiling temperature of water and above the freezing point of water, it is tacky and stringy, and then mixing therein a certain amount of water at substantially the same temperature of the mass (but not above the boiling point of the water), the water is absorbed by and distributed uniformly throughout the mass, so that the latter then consists of minute particles of water dispersed in the asphalt. Then on introducing into the mass a colloidal agent, which will form, with the water a stable protective filmy coating about the particles of asphalt, the continued introduction of water into the mass will cause the separation of the colloid-protected particles and their dispersion in the water.

In carrying out the process it is necessary that the body to be dispersed should be in a tacky stringy condition at a temperature above the freezing point of water and below a point at which water boils or is materially vaporized. Hence if the body is liquid at normal room temperature, it should be chilled to a point at which it reaches the specified condition within the temperature range stated, or, if it is normally solid at normal room temperature, it should be heated to a point at which it has softened and may be manipulated in the mixer.

I preferably employ for manipulating the mass, i. e. pulling, stretching and stringing it, and incorporating the water and the colloidal agent therein, a mixer of the general type of a "Ross" or "Werner" and "Pfleiderer" mixer, in which two rotary helixes or helically bladed rotors, operating at different peripheral speeds in close proximity without touching, are caused to operate in a trough-like closed casing, interiorly shaped complementally to the rotors. The operative blades should not be operated at high speed, but at a speed which results, in pulling, stringing, and mixing the mass in the manner of a dough mixer. The casing should be jacketed so that a heating or refrigerating medium may be caused to pass through the jacket so as to bring the mass to be dispersed to and maintain it at the temperature at which the mass is relatively soft, plastic and adhesive, and not in a liquid condition.

The mass having been placed in the mixer and brought to the desired temperature necessary to condition that particular mass for manipulation, water at substantially the same temperature is fed gradually into the mixer while the blades are in operation. The amount of water necessary for the most effective and finest dispersion of the mass, must be determined by trial, but it usually ranges from 10% to 15% of the weight of the body to be dispersed. When the water has been completely absorbed, there is now added to the mass and incorporated therein by the continued operation of the mixer, the required amount of the dispersing or stabilizing colloid. Preferably, though not necessarily, the colloid is mixed with water, to form a paste, or a gelatinous mass, depending of course, upon the particular colloid selected. Or if the colloid is placed in the mixer in a dry form, there is also gradually fed at the same time a stream of water. This is to supply sufficient water to prevent too great absorption by the added colloid of the water already in the mass and the disruption of the already formed colloidal particles of the body to be dispersed. It is observable that as the mixing continues, with the dispersion of the added colloid and water throughout the mass, a point is reached at which a change in phase occurs, the initial body in colloid-protected particles separating and constituting the disperse phase and the water the continuous phase of the disspersion.

Sometimes it is desirable to add to the water some agent to reduce the surface tension thereof and speed the change of phase and any such agent, which does not inhibit the dispersion may be employed, such for example as saponin or soapbark extract, or alkalis or alkali-acting bodies. I have used for this purpose very small proportions of caustic soda, caustic potash, borax, sodium silicate or the like.

I desire it to be understood that in the dispersion of various bodies immiscible with water, I may employ as the dispersing or stabilizing agent such colloids or substances as colloidal clay (including bentonite and wilkenite), ultra fine carbon black of colloidal size, glue, casein, Irish moss, agar-agar, blood albumen, bean albumen, or any other suitable colloid of animal, vegetable, or mineral origin.

The dispersion may be produced to have a consistency similar to that of salve or butter, but by the addition of water it may be diluted to practically any extent so as to have the consistency of thick or thin cream or milk, as may be desired. When in a relatively thick condition, like oil or water paint, it may be spread with a brush without gumming the brush, and if the colloidal dispersing agent has been properly selected and is not in excess, the dispersion may be formed in a film which on drying is not water absorbent.

By the process herein described I have successfully dispersed many bodies of widely different normal consistencies, such as paraffin, Japan wax, Montan wax, dammar gum, "nondescript gum", asphalt (including gilsonite) "mineral rubbers", reclaimed rubber, rubber substitutes, wax tailings, vegetable oils and oxidized and sulphurized oils, and various compositions of matter including mixtures of said materials. If desired there may be mixed with such bodies, preliminary to their dispersion, flour of sulphur, finely divided pigments, vulcanization accelerators, etc., without inhibiting the dispersion of the mixture.

As a concrete example of the dispersion of a given substance, of the class of those which may successfully be dispersed by my process, the following may be cited:—

Into a mixer such as herein referred to is placed a given quantity of asphalt, having a softening point not exceeding 80° C. By the application of heat, the mass is softened, and then when the mixer is set in operation an amount of water at substantially the temperature of the asphalt and approximating 12% of the weight of the asphalt, is fed gradually into the mixer. The latter is preferably provided with a cover which may be closed. As the mixer operates, the water is gradually absorbed and entirely disappears in the mass, this occurring in about half an hour. The water is not visible in the mass, but its absorption is accompanied by a corresponding increase in the bulk and weight of the mass. The mass is sticky and adhesive, and clings to the blades and to the interior surfaces of the mixer. I then add to the mass, a paste or mud of the same temperature as the mass and consisting of a suspension of colloidal clay in water, in the proportion of, say 4% by weight of dry clay to the weight of the asphalt. This is homogeneously incorporated in the mass in about ten minutes and water is gradually added to the mass. After a period of about 20 minutes, a change takes place, and the water constitutes the continuous phase. When this happens, the inner surfaces of the mixer and the blades are observed to have been freed from any adhering asphalt and are substantially clean. In the product thus produced, if the process has properly been carried on, the dispersed particles appear to be of uniform size, and of an order of magnitude substantially no greater than rubber globules in latex. The apparent change of phase occurs, when or before the mass is of about the consistency of cold cream, salve, or butter, but if the addition of water be continued, the dispersion may be increasingly diluted.

What I claim is:

1. A process of dispersing in water bodies which are immiscible with water, which comprises causing any such body to absorb water by manipulating such body in the presence of water, and then mixing with the mass a dispersing agent together with water.

2. A process of dispersing in water bodies which are immiscible with water, which comprises causing any such body to absorb water to approximately the point of saturation, by manipulating such body in the presence of water, and then mixing with the mass a dispersing agent together with water.

3. A process of dispersing in water bodies which are immiscible with water, which comprises conditioning any such body to a tacky condition at a temperature above the freezing point of water and below the boiling point of water, causing such body to absorb water during such conditioning and then mixing with said body a dispersing agent together with water, until the said body disperses in the water.

4. A process of dispersing in water bodies which are immiscible with water, which comprises conditioning any such body to a tacky condition at a temperature above the freezing point of water and below the boiling point of water, causing such body to absorb water in an amount substantially equal to the absorption capacity of such body during such conditioning, and then mixing with said body a dispersing agent together with water, until the said body disperses in the water.

In testimony whereof I have affixed my signature.

WILLIAM BEACH PRATT.